US010699358B2

(12) United States Patent
Lancioni et al.

(10) Patent No.: US 10,699,358 B2
(45) Date of Patent: Jun. 30, 2020

(54) IMAGE HIDDEN INFORMATION DETECTOR

(71) Applicant: MCAFEE, LLC, Santa Clara, CA (US)

(72) Inventors: German Lancioni, San Jose, CA (US); Sherin M. Mathews, Santa Clara, CA (US)

(73) Assignee: MCAFEE, LLC, Santa Clara, CA (US)

( * ) Notice: Subject to any disclaimer, the term of this patent is extended or adjusted under 35 U.S.C. 154(b) by 133 days.

(21) Appl. No.: 15/902,842

(22) Filed: Feb. 22, 2018

(65) Prior Publication Data

US 2019/0259126 A1  Aug. 22, 2019

(51) Int. Cl.
*G06T 1/00* (2006.01)
*G06T 7/136* (2017.01)
(Continued)

(52) U.S. Cl.
CPC ........ *G06T 1/0028* (2013.01); *G06K 9/00684* (2013.01); *G06K 9/3216* (2013.01); *G06K 9/346* (2013.01); *G06K 9/4628* (2013.01); *G06K 9/627* (2013.01); *G06T 1/0078* (2013.01); *G06T 7/136* (2017.01); *G06T 7/143* (2017.01); *G06T 2201/0051* (2013.01); *G06T 2201/0065* (2013.01); *G06T 2207/20076* (2013.01); *G06T 2207/20084* (2013.01)

(58) Field of Classification Search
None
See application file for complete search history.

(56) References Cited

U.S. PATENT DOCUMENTS

2003/0026447 A1* 2/2003 Fridrich ................. G06T 1/005
382/100
2007/0104325 A1* 5/2007 Lee ......................... G06F 21/16
380/37
(Continued)

FOREIGN PATENT DOCUMENTS

CN    105760859    7/2016
CN    106096668    11/2016

OTHER PUBLICATIONS

Shulmin et al., "Steganography in Contemporary Cyberattacks," SECURELIST, https://securelist.com/steganography-in-contemporary-cyberattacks/79276/, Aug. 3, 2017, 12 pages.
(Continued)

*Primary Examiner* — Leon Viet Q Nguyen
(74) *Attorney, Agent, or Firm* — Hanley, Flight & Zimmerman LLC

(57) ABSTRACT

A hidden information detector for image files extracts N least significant bits from each of a first set of pixels of an image file, wherein N is an integer greater than or equal to 1. The detector then applies a mask to each of the extracted N least significant bits to form a second set of pixel values and determines a first probability as to whether the second set of pixels encodes a hidden image. Responsive to the first probability exceeding a first threshold, the detector determines a second probability as to whether the second set of pixels matches an image encoded in the first set of pixels. Responsive to a determination that the second probability is less than a second threshold, the detector performs a non-image classifier on the second set of pixels.

19 Claims, 7 Drawing Sheets

(51) Int. Cl.
*G06T 7/143* (2017.01)
*G06K 9/32* (2006.01)
*G06K 9/34* (2006.01)
*G06K 9/46* (2006.01)
*G06K 9/00* (2006.01)
*G06K 9/62* (2006.01)

(56) References Cited

U.S. PATENT DOCUMENTS

2017/0249339 A1* 8/2017 Lester ................ G06K 9/00979
2018/0018535 A1 1/2018 Li et al.

OTHER PUBLICATIONS

International Searching Authority, "International Search Report," issued in connection with application No. PCT/US2019/018844, dated May 3, 2019, 3 pages.

International Searching Authority, "Written Opinion," issued in connection with application No. PCT/US2019/018844, dated May 3, 2019, 4 pages.

* cited by examiner

IMAGE HIDDEN INFORMATION DETECTOR

TECHNICAL FIELD

Embodiments described herein generally relate to a determination of a type of information hidden in an image file.

BACKGROUND ART

Data leak prevention (DLP) solutions are capable of inspecting incoming and outgoing traffic to detect and prevent potential data leaks (e.g., the distribution of confidential, sensitive information by hiding such information in a file). One type of DLP solution includes removing sensitive, private, and/or traceable information from metadata fields in the files. Removing such information helps to protect potentially sensitive information that may have been included in the files' metadata fields. A DLP solution can remove or overwrite data contained in metadata fields of a file. However, there are other ways in which a data leak can occur. For example, information can be hidden with a file such as an image file.

DESCRIPTION OF EMBODIMENTS

Figure 1A:
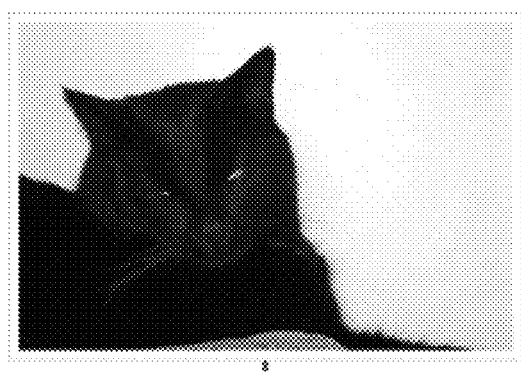
FIG. 1A is an example of input image.

The disclosed embodiments are directed to an assessment of the type of information that has been hidden in an image file. The image files processed by the disclosed embodiments comprise uncompressed files such as portable network graphics (PNG) files and bitmap (BMP) files. Hidden information in an image file refers to information that is not visible when the image file is rendered on an output device such as a display or a printer. The hidden information may be in the form of another image, American Standard Code for Information Interchange (ASCII) characters, binary data, and encrypted data. FIG. 1A shows an example of an image file that, when rendered on an output device, is a picture of a cat. The image file contains multiple pixel color values. Each pixel may be a multibit value (e.g., 8 bits) that represents a shade of gray or a color (e.g., red, green, or blue). For a color image, each pixel includes three color values—one for red, one for green, and one for blue. Each such color value may be an 8-bit value.

Figure 1B:
FIG. 1B is an example of a hidden image in the input image of FIG. 1A.

FIG. 1B shows an image hidden in the image file of FIG. 1A. The hidden image shows two people. The hidden image in FIG. 1B is derived from the pixels of the original composite image of FIG. 1A. In one example, an image can be hidden in an image file through modification of the N least significant bits (LSBs) of each pixel in the image file, where N is an integer 1 or greater. For example, in an image file in which each pixel is 8 bits long, N may be 1, 2 or 3. The least significant bit of each pixel may be modified in such a way that if the LSB of each pixel is extracted and mask applied to the extracted LSBs, the resulting modified pixel values, when rendered on an output device, may encode an image that is different from the original composite image. In one example, the single LSB of each pixel (bit[0]) is extracted and '0000000' is applied to the extracted bit[0] to reform an 8-bit pixel value. The reformed pixel value will be '0000000x', where 'x' is the extracted bit[0]. Repeating that process for all of the pixels in the original image file results in a second set of pixel values that may encode a different image altogether, such as the people in FIG. 1B based on the cat image of FIG. 1A. As only the least significant bit is extracted, the resolution and image quality may be lower than that of the original composite image, but an image can nonetheless be hidden.

Figure 2A:
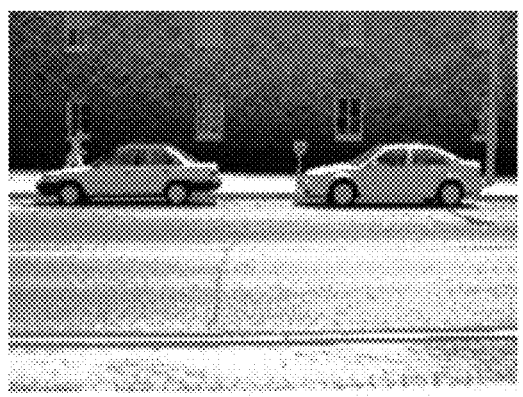
FIG. 2A is another example of input image.
Figure 2B:
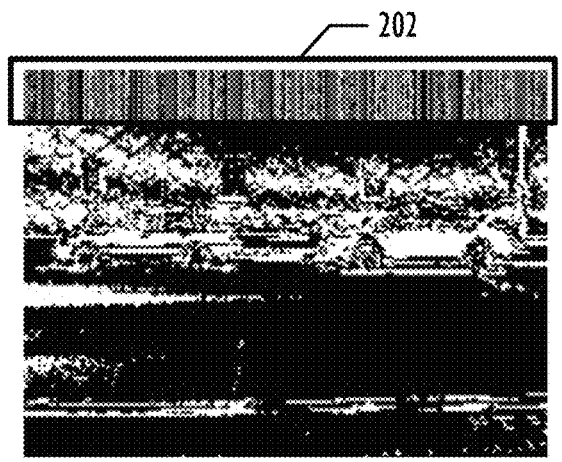
FIG. 2B is an example of a hidden information (e.g., ASCII characters) in the input image of FIG. 2A.

FIG. 2A shows another example of an original composite image. The process noted above is repeated in which the LSBs of each pixel are extracted to form a second set of pixels. In FIG. 2B, the second set of pixels, when rendered on an output device, show a low resolution, low contrast version of the original image of FIG. 2A. The image shown in FIG. 2B thus is not a different hidden image, but is simply a lower resolution version of the image rendered with the full pixel values. The top portion 202 of the rendered image in FIG. 2B shows what appears to be noise. In this example, top portion 202 does not contain a hidden image or even the original image. Instead, the LSBs of the pixels corresponding to the top portion 202 encode a different type of information such as ASCII codes, binary data, or encrypted data. An ASCII code, for example, is an 8-bit value that corresponds to an alphanumeric character, punctuation characters, etc. ASCII codes may be hidden in the original image file by modifying at least some of the LSBs of the pixels to be ASCII codes. For example, 8 contiguous pixels in the image file may have their LSBs modified such that the 8 modified LSBs collectively represent an ASCII code. As such, each group of, for example, eight consecutive pixels may have been modified to encode ASCII codes in their LSBs. When rendered on an output device, however, the ASCII codes look like noise.

Hidden binary data comprises non-ASCII and non-encrypted content such as other files (a Word document, an Excel spreadsheet, a PE (portable executable) file, a Zip file, or any other file format that is not saved as plain-text. Hidden encrypted data represents data that has been encrypted in accordance with any of a variety of encryption techniques.

Because only a relatively small number of LSBs (e.g., 1, 2, or 3 LSBs) are modified to steganographically hide information in an image file, it is difficult if not impossible to visually determine that the image file has been modified in this manner. For example, in examining the cat image of FIG. 1A, the hidden people of FIG. 1B cannot be discerned, nor is it readily apparent that the image file has even been modified to include hidden information.

The disclosed embodiments are directed to a technique for determining the likely type of information hidden in the image file. Once a determination is made that a certain type of information is likely hidden in the image file, further analysis can be performed on the file to ascertain the exact content and meaning of the hidden information.

Figure 3:
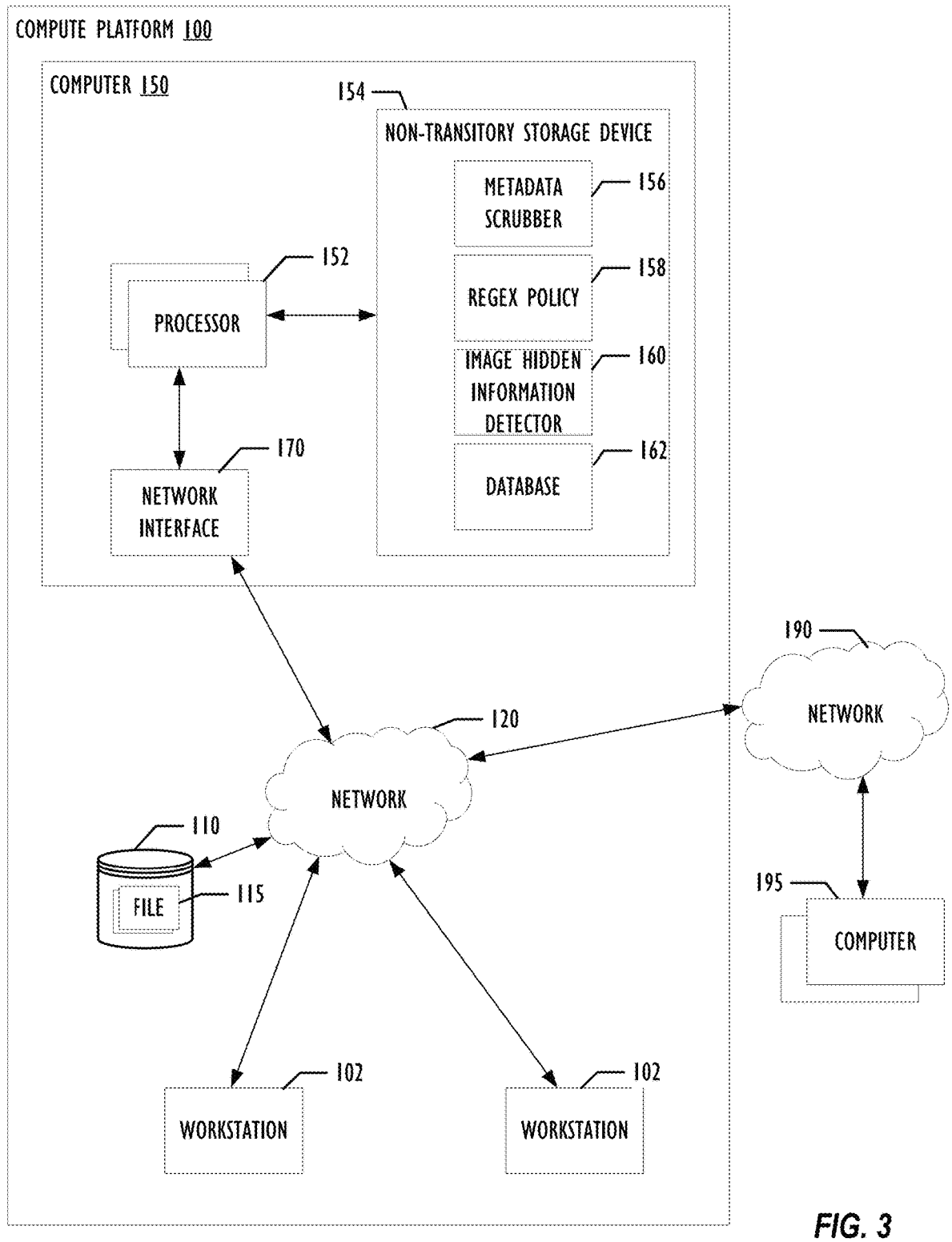
FIG. 3 is an example of a system for detection of the type of hidden information in an input image file according to one embodiment.

FIG. 3 shows a system according to an embodiment. The system of FIG. 3 includes a compute platform 100. The compute platform 100 includes an internal network 120 which provides communication between and among one or more workstations 102, storage 110 and a computer 150. The compute platform 100 may be usable by a corporate entity and thus the workstations 102 may be used by employees of the corporate entity or by people otherwise permitted to use the compute platform 100. The compute platform 100 may provide access to external computers 195 via a public network 190 (e.g., the Internet). Files may be transmitted from the external computers 195 to the workstations 102, and from the workstations 102 to the external computers 195. Further, files may be exchanged between the workstations 102. Storage 110 may store files (shown as files 115). Any or all of the files (including files 115) may be processed by computer 150 to determine whether the files have been steganographically encoded as described herein.

The workstations 102 may comprise personal computers (desktops, notebooks, etc.), tablet devices, smart phones, or other types of computer devices. Each workstation 102 may include one or processors and memory containing executable machine instructions. The storage 110 may comprise a single storage drive such as a magnetic storage drive (e.g., a hard disk drive), a solid-state storage drive (SSD) or multiple drives. The storage 110 may comprise network-attached storage that is usable by any of the workstations 102 and the computer 150.

The computer 150 includes one or more processor 152, a non-transitory storage device 154, and a network interface 170. The network interface 170 provides network connectivity to the computer 150. The non-transitory storage device 154 may comprise volatile storage (e.g., random access memory) and/or non-volatile storage (magnetic storage, solid-state storage, etc.). Machine instructions are stored on the non-transitory storage device 154 and executed by the processor 152. The computer 150 comprises a computing resource that is usable to perform data leak prevention (DLP) operations. In other embodiments, the computing resource to perform DLP operations may comprise multiple computers 150, such as part of a DLP service implemented on the compute platform 100. The machine instructions stored in non-transitory storage device 154 in this example include metadata scrubber 156, regex policy 158 and image hidden information detector 160. Different or additional DLP machine instructions may be included as well.

The metadata scrubber 156 processes a file by removing or overwriting some or all of the metadata fields of the file. The regex policy 158 attempts to find explicit matches using predefined policies such as removing personal identifiable information from documents (credit card numbers, SSNs, etc.) or enforcing a strict classification to documents containing codenames or financial data. Other DLP processing software may be executed as well on computer 150.

The image hidden information detector 160 analyzes uncompressed image files (or lossless image files, e.g., files that have been compressed without the loss of any of the original content). In general, the image hidden information detector 160 analyzes the LSBs of the pixel values in image files to determine the type of information that may be encoded (hidden) in the image files' pixels. Various types of hidden information can be detected by the image hidden information detector 160 such as images, ASCII codes, binary data, and encrypted data.

In the context of a corporate entity, some or all of the files incoming to the compute platform 100 from, for example, external computers 195 are analyzed by the suite of DLP software tools comprising in this example, the metadata scrubber 156, regex policy 158, and the image hidden information detector 160. Further, some or all of the files outgoing from the compute platform 100 destined for an external computer 195 also may be processed in this manner. The DLP analysis of such files may be triggered by a corporate email program that executes on computer 150 or another computer within the compute platform 100. When an email, containing an image file as an attachment, is sent or received, the email program may make an application program interface (API) call to activate execution of the image hidden information detector 160.

The image hidden information detector 160 operates on image files in the disclosed examples. The image files may be transmitted between the workstations 102 or between a workstation 102 and an external computer 195. During transit, the file can be processed by the image hidden information detector 160 before its transmission is completed. Further, the image hidden information detector 160 may receive image files 115 from storage 110 to process as described herein.

If a file is determined to encode a certain type of hidden information, then the file can be marked for further analysis. Marking a file may include tagging the file with metadata identifying it as containing hidden information of a certain type (e.g., image, ASCII codes, binary data, encrypted data, etc.). Marking a file alternatively or additionally may include adding a record to database 162 identifying the image file as having been steganographically modified to thereby contain hidden information.

Figure 4:
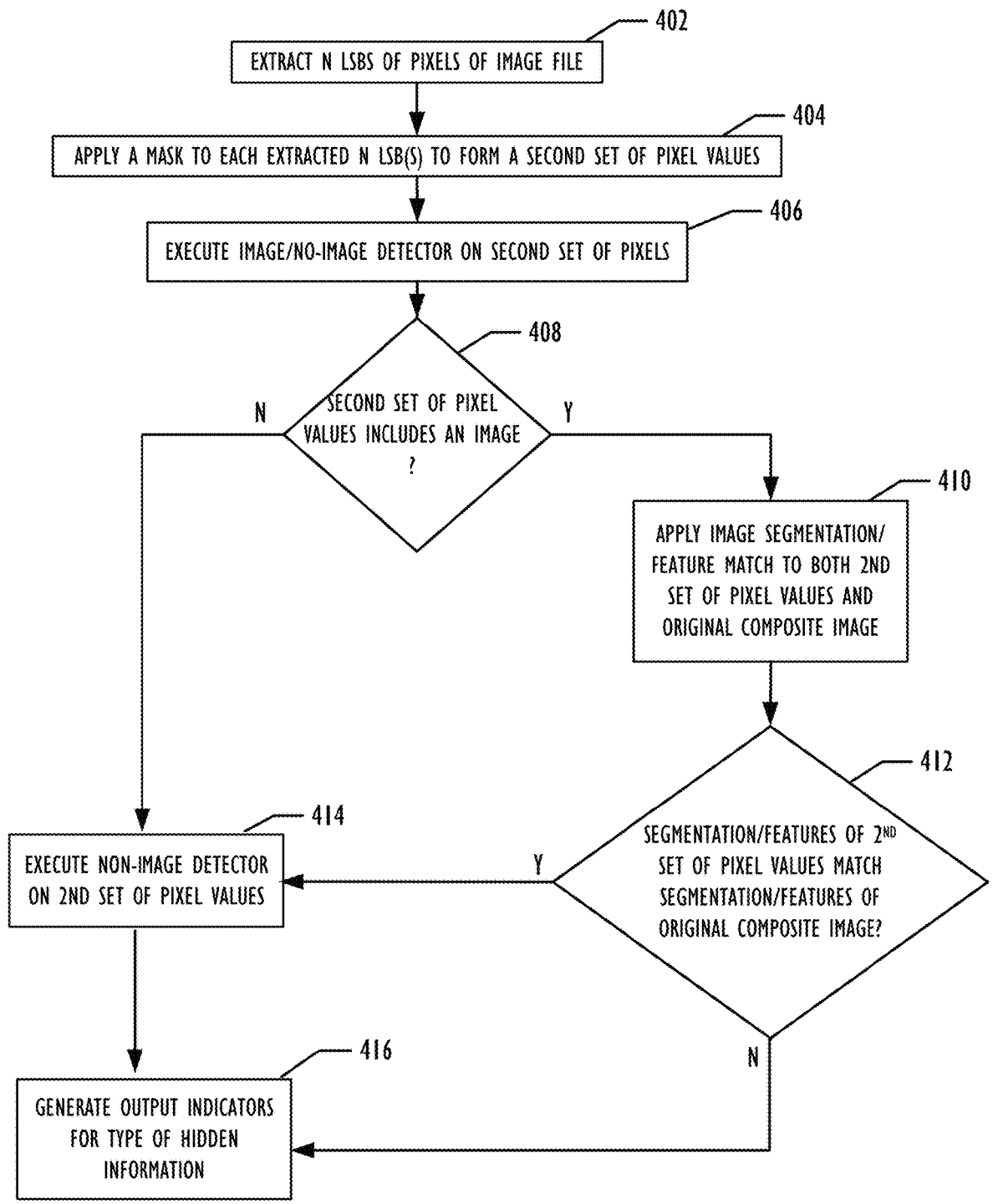
FIG. 4 is a flowchart of a method implemented by the system of FIG. 3.

FIG. 4 shows an example of a method performed by the image hidden information detector 160, upon its execution by a processor 152. The example method shown in FIG. 4 is performed on an input image file. The image file may be a file that is not compressed. At operation 402, the method includes extracting the N-LSBs of the pixels of the image file. As noted above, each pixel may be represented by a multi-bit gray scale value, or by a set of color pixel values (e.g., red, green, and blue). In some implementations, N is initially set to a value of 1 and thus the LSB of each pixel is extracted. Extracting the LSB includes copying the bit into a register or other memory storage element.

At 404, the method includes applying a mask to each extracted N LSBs to form a second set of pixel values. The mask comprises enough 0's that, when prepended to the extracted LSB(s) for a given pixel, forms a full pixel (e.g., 8 bits). For example, if the LSB of an 8-bit pixel value is extracted, a mask comprising '0000 000' is prepended to the extracted pixel to form a full 8-bit pixel value. If 2 LSBs are extracted (N=2) from each of the original pixels, then a mask comprising '000 000' is prepended to the two extracted bits to form a full 8-bit pixel value. In the case of a tripartite pixel (including a red pixel color value, a green pixel color value and blue pixel color value), the extracted N LSBs comprise the N LSBs of each constituent color value and a formulated tripartite set of pixel values are formed by prepending the extracted N LSBs of each color with the mask value.

At 406, method includes executing an image/no-image detector on the second set of pixel values. The image/no-image detector determines whether the second set of pixels (i.e., the pixels generated by applying a mask to the extracted LSBs of each of the pixels of the original image) encodes an image or does not encode an image. In some implementations, the image/no-image classifier computes a probability as to whether the second set of pixel values encodes an image. The image/no-image classifier detector compares the original image against the image based on the N-LSBs. The detector is based on, but not limited to, feature matching which attempts to recognize objects/shapes in a picture and compare the attributes of that shape (size, edges, position, etc.) against a match on the other image. For example, if two images are compared (both containing the same cat), then the feature matching algorithm will identify (via image segmentation) the eyes, the body, the tail, the sky background, etc. and will compare these shapes against the ones found on the other image. Based on a threshold, the comparison can be classified to arrive to a conclusion (e.g. these two images are 90% similar, so it is concluded there is not a different image hidden inside the image, but just the ghost version of the original one). Another enhancement that may improve the accuracy of the image/no image detector is an edge detection algorithm which highlights the relevant parts of a shape (such as the external edges) and eliminates or reduces the less relevant parts (i.e. a tiny button in a shirt). This helps the feature matching algorithm to achieve better results by just focusing on the overall picture instead of the details.

At 408, the method includes determining whether the second set of pixel values includes an image. If the image/no-image detector produces a probability value, the determination operation of 408 includes determining whether the probability value exceeds a threshold. The threshold may be preset. A probability value in excess of the threshold indicates that the second set of pixels encode an image, whereas a probability value below the threshold indicates that the second set of pixels does not encode an image.

If the second set of pixels encodes an image, then the method assesses whether the image encoded in the second set of pixels is a substantially different image than that represented by the pixels in the original composite image. For example, at 410, the method includes applying image segmentation/feature matching to both the second set of pixel values and the original composite image.

At 412, the method includes determining whether the segmentation/features of the second set of pixel values match the segmentation/features of the original image. In one embodiment, a score (e.g., a probability value) is compared to a threshold and if the score is greater than another threshold (different than the threshold used at 408), then the image represented by the second set of pixel values is likely the same image as the image represented by the original pixels of the image file (i.e., the "yes" branch). However, if the score is smaller than the threshold, then the image represented by the second set of pixel values is likely a different image than the image represented by the original pixels of the image file (i.e., the "no" branch). In the former case, there is an image in the second set of pixel values, but that image is not "hidden" (i.e., does not represent hidden information), but in the latter case, there is an image in the second set of pixels that does represent a hidden image.

If the image encoded in the second set of pixel values is determined to be different than the image in the original pixels, then at 416, the method includes generating an output indicator indicating the type of hidden information in the image file (e.g., a hidden image). The output indicator may be a visual indicator on a display, a printed output, an alphanumeric value stored in memory such as the non-transitory storage device 154, an email message, etc. The output indicator may be represented as a probability value that hidden information in the image file is of a certain type (e.g., a 92% probability that the hidden information is another image).

If, however, the image encoded in the second set of pixel values is determined (at 412) to be an image that is substantially the same as the image in the original pixels or if the second set of pixel values at 408 is determined not to include an image at all, then at 414, the method includes executing a non-image classifier on the second set of pixel values to determine whether information that may be hidden in the image is something other than another image. As noted above, examples of such non-image information includes ASCII codes, binary data, and encrypted data. In one example, the non-image classifier includes a convolutional neural network. The non-image classifier may include a convolutional neural network (CNN). A CNN is an image classifier that takes an input image and outputs the probability of classes that best describes the image. In this example, the CNN classifier will output one of three classes (ASCII, binary, encrypted code) based on a probability score.

Figure 5:
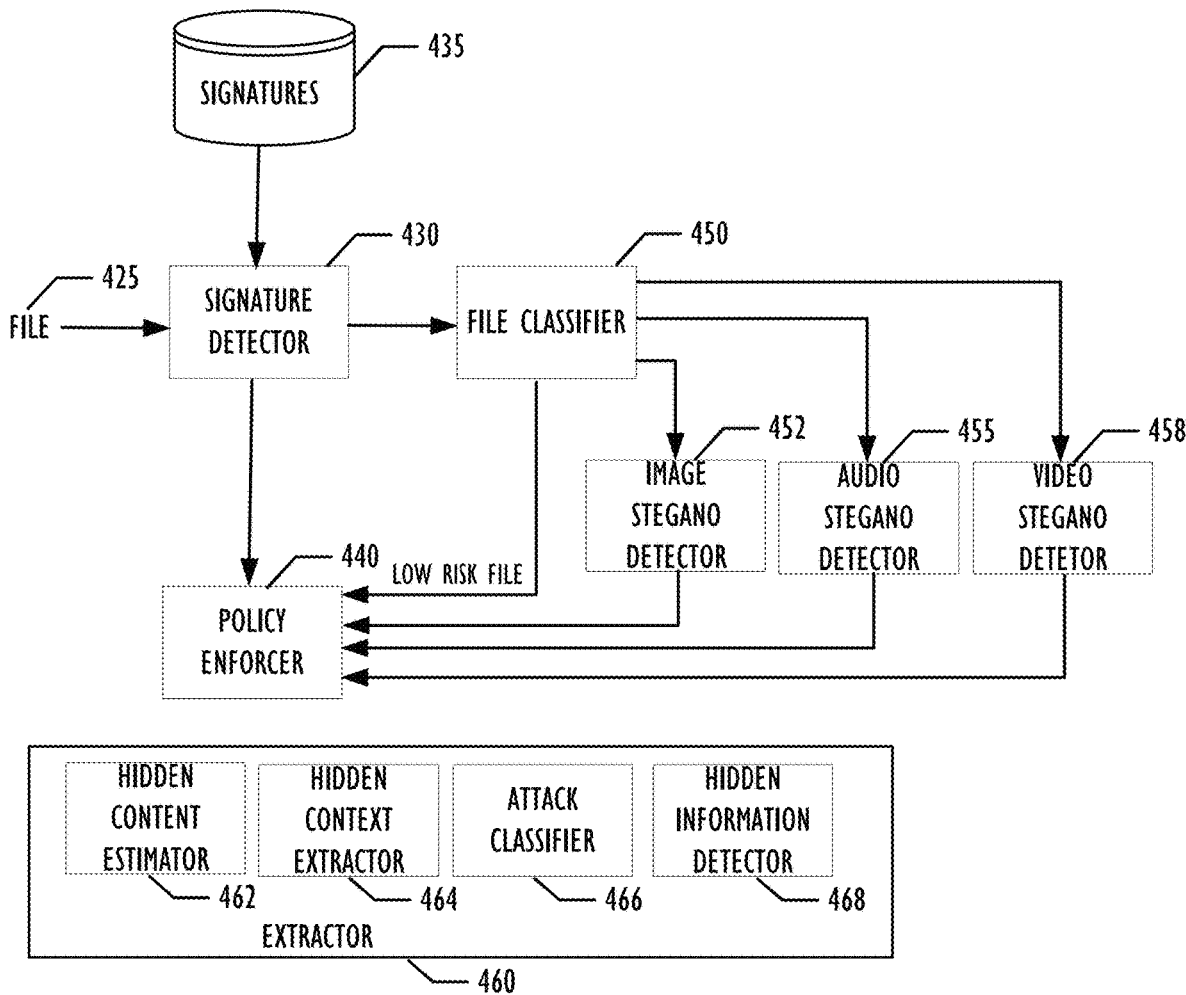
FIG. 5 is a block diagram of DLP system that includes the system of FIG. 3 in accordance with an example.

FIG. 5 is a block diagram of an example implementation that includes the image hidden information detector described above. The system of FIG. 5 assesses whether an input file 425 has been steganographically encoded and thus likely contains hidden information. Those input files 425 that are image files and are determined to contain hidden information are then processed by the image hidden information detector as described above. The example system of FIG. 5 includes a signature detector 430, a signatures database 435, a policy enforcer 440, a file classifier 450, an image stegano (short for "steganography") detector 452, an audio stegano detector 455, a video stegano detector 458, and an extractor 460.

The signature detector 430 receives the file 425 and uses any of a variety of techniques to generate one or more signatures of the file 425. As used herein, a "signature" is an electronic identifier (e.g., a fingerprint) computed based on or more aspects of one or more portions of the file 425. A signature is generally unique to the particular file 425 from which the signature is derived and can be used as a proxy for the file itself in various activities such as matching or identification. In some implementations, a signature corresponds, or is derived from, to a portion of a file, and a given file may have multiple signatures.

The signature detector 430 computes the signature and then compares the signature to the signatures stored in signatures database 435. The signatures stored in the signatures database are signatures of files known to contain steganographically hidden information. When the signature detector 430 determines that the one or more signatures generated based on the file 425 match one of the stored signatures in signatures database 435, the signature detector 430 transmits the file 435 to the policy enforcer 440. The policy enforcer 440 then applies a remediation policy corresponding to the file 425.

However, if the signature detector 430 is unable to find a match in the signatures database 435 to the signature generated for input file 425, the signature detector 430 provides the file 425 to the file classifier 450. The classifier 450 includes a classification tree library and a tree traverser. The tree traverser traverses the classification tree and, while traversing the classification tree, compares the contents of the file 425 to the information contained in the classification tree. In one example, the classification tree includes multiple tiers. A top tier identifies various carrier families, such as an image carrier family, an audio carrier family, and video carrier family. A second tier within the classification tree lies below the top tier and identifies formats associated with the carrier families of the top tier. In one example, the formats associated with the image carrier family includes a BMP format, a PNG format, graphics interchange format (GIF), and a Joint Photographic Experts Group (JPEG) format. The formats associated with the audio carrier family include a moving pictures experts group-3 (MPEG-3) and a free lossless audio code (FLAC) format. The formats associated with the video carrier family includes a moving pictures experts group-4 (MPEG-4) and a Windows media video (WMV) format.

Additional tiers also may be implemented by the classification tree. A third tier, for example, may identify various characteristics of each of the formats of the second tier. For example, a matrix dimension characteristic may be associated with the PNG format of the second tier. The matrix dimension characteristic may specify a matrix dimension that is less than or equal to 16×16 or that is greater than 16×16. Other characteristics may be included for any of the other formats of the second tier. Further information may be present in the classification tree within a fourth or further tier if additional specifications are relevant to any of the characteristics identified in the third tier.

For a given file format in the second tier of the classification tree is a probability value associated with a particular set of parameters for that particular file format as defined by the classification tree. The probability values indicate the likelihood that a file matching that particular set of branches in the classification tree is an appropriate candidate for further analysis as potentially have been steganographically encoded to include hidden information. For example, the classification tree may specify a probability of 82% that a PNG image file that has a matrix with dimensions that are equal to or less than 16×16 and that is characterized as FAVICON (short for "favorite icon") may have steganographically hidden information and should be further analyzed. A file characterized as FAVICON is a file that contains one or more icons associated with a website. By way of another example, the classification tree may specify a probability of 18% that a PNG image file with a matrix having dimensions that are equal to or less than 16×16 and is that characterized as non-FAVICON contains steganographically hidden information.

The tree traverser within the file classifier 450 traverses the classification tree based on the corresponding format and characteristic of the file 425. The tree traverses identifies the probability contained in the classification tree. If the probability is less than the predetermined threshold, the file classifier 450 determines that the file has a relatively low likelihood of containing steganographically hidden information. In some implementations, files determined to have a low likelihood of containing steganographically hidden information are provided to the policy enforcer 440 along with the probability value. The policy enforcer 440 may take no further action on the file. For example, for an image file determined to have a low probability of containing steganographically hidden information, the policy enforcer 440 may not cause the file to be processed by the image hidden information detector 468 (described above) within the extractor 460.

However, if the file classifier 450 determines that file 425 has a probability of containing steganographically hidden information that is greater than the threshold, then, based on the type of carrier family (image, audio, video), the file classifier 450 provides the file 425, the probability value, the file format, characteristic and sub-characteristic information from the classification tree that map to the file 425 to the corresponding one of the image stegano detector 452, the audio stegano detector 455, and the video stegano detector 458. The detector 425, 455, or 458 that receives the file 425, characteristics and sub-characteristics selects from a library one or types of detection techniques for application to the file 425. For example, the image stegano detector 452 selects a detection technique based on the type of encoding that is typically used to steganographically hide information in an image having the format, characteristics and sub-characteristics identified by the file classifier 450. The detection technique selected for the particular file 425 may be one or more of different statistical methods and/or machine learning classifiers.

Once the policy enforcer 440 receives the file 425 from the corresponding image stegano detector 452, audio stegano detector 455 or video stegano detector 458, along with file's characteristic and sub-characteristic data, the policy enforcer 440 submits a request to the extractor 460 to take further action. The extractor 460 includes a hidden content estimator 462, a hidden content extractor 464, an attack classifier, and an image hidden information detector 468. The hidden content estimator 462 identifies the portion of the file 425 estimated as most likely to contain the hidden content. The hidden content extractor 464 then may extract the hidden content and supply the extracted hidden content to the attack classifier, which classifies the extract hidden content (e.g., malvertising attack, exfiltration attack, etc. Additionally, or alternatively, the file 425 may be provided by the policy enforcer 440 to the image hidden information detector 468, which performs the functionality described above with respect to FIGS. 3 and 4.

Figure 6:
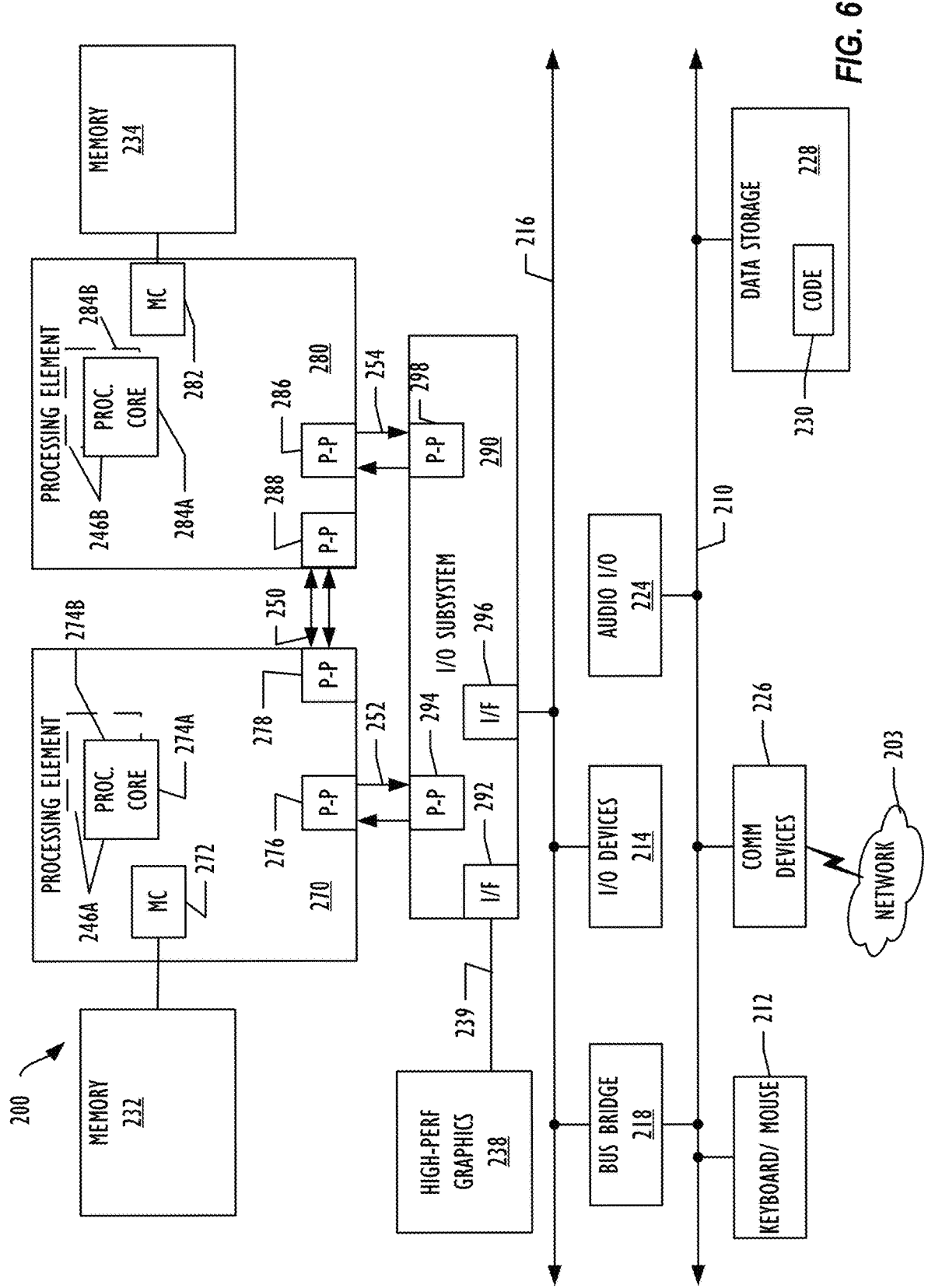
FIG. 6 is a block diagram illustrating a computing device for use with techniques described herein according to one embodiment.
Figure 7:
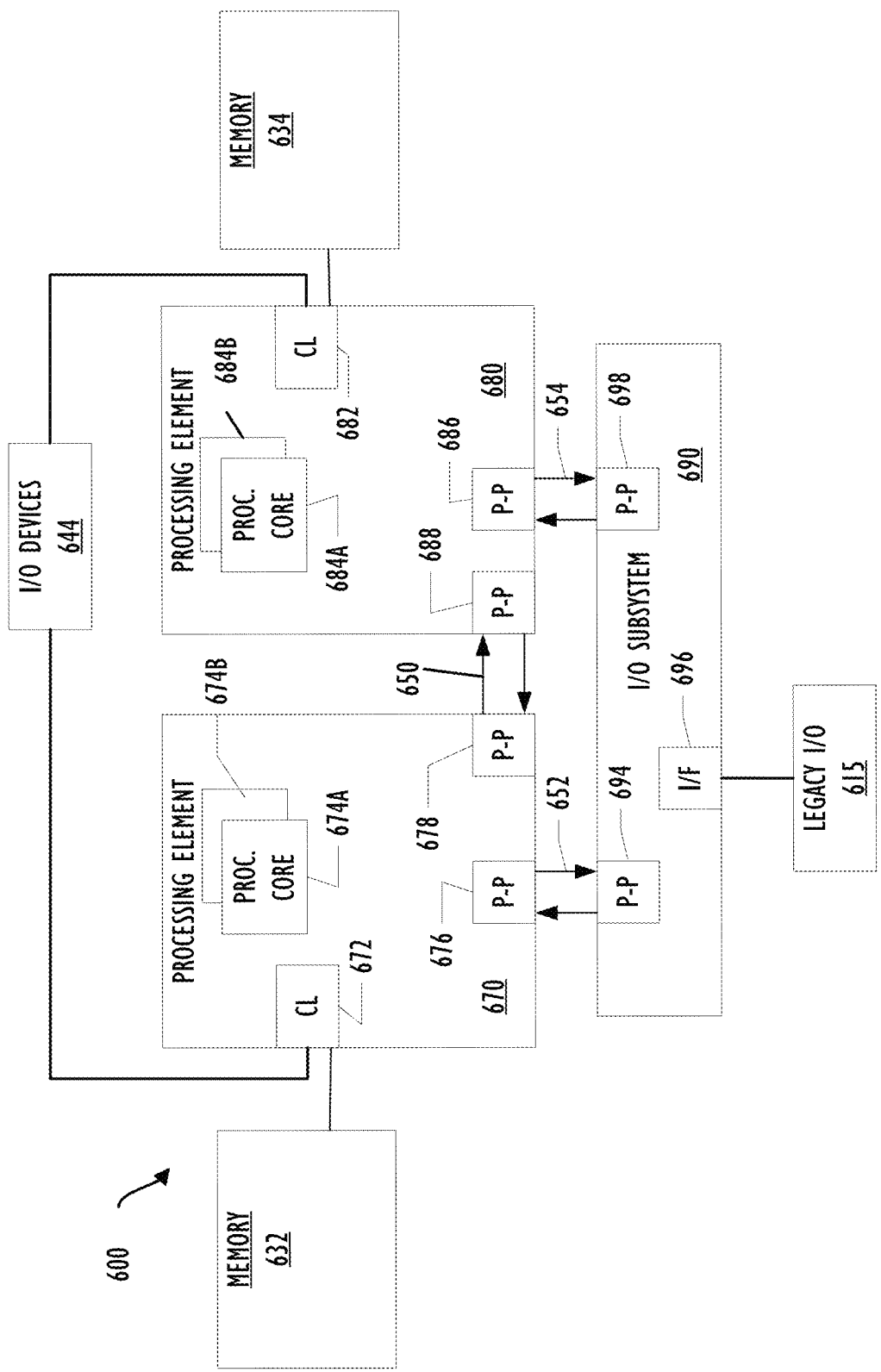
FIG. 7 is a block diagram illustrating a network for use with techniques described of according to one embodiment.

FIGS. 6 and 7 comprise examples of computing resources for implementation of the image hidden information detector 160. Referring now to FIG. 6, a block diagram illustrates a programmable device 600 that may be used for implementing the techniques described herein in accordance with one embodiment. The programmable device 600 illustrated in FIG. 6 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 6 may be implemented as a multi-drop bus rather than point-to-point interconnects.

As illustrated in FIG. 6, each of processing elements 670 and 680 may be multicore processors, including first and second processor cores (e.g., processor cores 674*a* and 674*b* and processor cores 684*a* and 684*b*). Such cores 674*a*, 674*b*, 684*a*, 684*b* may be configured to execute instruction code. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646*a*, 646*b* may store data (e.g., instructions) that are utilized by one or more components of the processing element, such as the cores 674*a*, 674*b* and 684*a*, 684*b*, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 6 illustrates a programmable device with two processing elements 670, 680 for clarity of the drawing, the scope of the present disclosure is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, micro-architectural, thermal, power consumption characteristics, and the like. These differences may effectively manifest themselves as asymmetry and heterogeneity amongst processing elements 670, 680. In some embodiments, the various processing elements 670, 680 may reside in the same die package.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discreet logic outside processing elements 670, 680 rather than integrated therein.

Processing element 670 and processing element 680 may be coupled to an I/O subsystem 690 via respective P-P interconnects and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present disclosure is not so limited.

As illustrated in FIG. 6, various I/O devices 614, 624 may be coupled to first link 616, along with a bridge 618 that may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second link 620.

Note that other embodiments are contemplated. For example, instead of the point-to-point architecture of FIG. 6, a system may implement a multi-drop bus or another such communication topology. Although links 616 and 620 are illustrated as busses in FIG. 6, any desired type of link may be used. In addition, the elements of FIG. 6 may alternatively be partitioned using more or fewer integrated chips than illustrated in FIG. 6.

Referring now to FIG. 7, a block diagram illustrates a programmable device 700 according to another embodiment. Certain aspects of FIG. 6 have been omitted from FIG. 7 in order to avoid obscuring other aspects of FIG. 7.

FIG. 7 illustrates that processing elements 770, 780 may include integrated memory and I/O control logic ("CL") 772 and 782, respectively. In some embodiments, the 772, 782 may include memory control logic (MC) such as that described above in connection with FIG. 6. In addition, CL 772, 782 may also include I/O control logic. FIG. 7 illustrates that not only may the memories 732, 734 be coupled to the CL 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 7 as processor cores 774A, 774B, 784A and 784B. As illustrated in FIG. 7, I/O subsystem 790 includes point-to-point (P-P) interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 6 and 7 are schematic illustrations of embodiments of programmable devices that may be utilized to implement various embodiments discussed herein. Various components of the programmable devices depicted in FIGS. 6 and 7 may be combined in a system-on-a-chip (SoC) architecture.

EXAMPLES

The following examples pertain to further embodiments.

Example 1 is a non-transitory storage device storing machine instructions, wherein the machine instructions, when executed by a computing resource, cause the computing resource to extract N least significant bits from each of a first set of pixels of an image file, wherein N is an integer greater than or equal to 1. A mask is applied to each of the extracted N least significant bits to form a second set of pixel values and a determination a first probability is made as to whether the second set of pixels encodes a hidden image. Responsive to the first probability exceeding a first threshold, a second probability as to whether the second set of pixels matches an image encoded in the first set of pixels is determined. Responsive to a determination that the second probability is less than a second threshold, a non-image classifier is performed on the second set of pixels.

In Example 2, the subject matter of Example 1 can optionally include the machine instructions causing the computing resource to cause, responsive to the first probability not exceeding the first threshold, the computing resource to perform the non-image classifier on the second set of pixels.

In Example 3, the subject matter of any one of Examples 1-2 can optionally include the computing resource to cause, responsive to the second probability exceeding the second threshold, the computing resource to generate an output indicating that the image file includes a hidden image.

In Example 4, the subject matter of any one of Examples 1-3 can optionally include the computing resource to cause, responsive to the second probability exceeding the second threshold, the computing resource to generate an output indicating that the image file includes a hidden image.

In Example 5, the subject matter of any one of Examples 1-4 can optionally include the computing resource to cause the computing resource to perform the non-image classifier using a convolutional neural network.

In Example 6, the subject matter of any one of Examples 1-2 can optionally include the computing resource to cause the computing resource to perform the non-image classifier using a convolutional neural network that determines whether information encoded in the extracted N least significant bits comprises at least one of American Standard Code for Information Interchange (ASCII) characters, binary data, and encrypted data.

In Example 7, the subject matter of any one of Examples 1-6 can optionally include the image file being uncompressed.

In Example 8, the subject matter of any one of Examples 1-7 can optionally include N being 1, 2, or 3.

Example 9 is a system to determine a type of concealed information steganographically encoded into an image file. This example includes a network interface to receive an image file; and one or more processors coupled to the network interface. The one or more processors are configured to extract N least significant bits (LSBs) from each of a first set of pixels of an image file, wherein N is an integer greater than or equal to 1, compute a first probability as to whether the extracted N LSBs encode a hidden image, and, responsive to the first probability not exceeding a first threshold wherein the first threshold is indicative of the extracted N LSBs encoding a hidden image, perform a non-image classifier on the extracted N LSBs.

In Example 10, the subject matter of Example 9 can optionally include that the one or more processors are configured to, responsive to the first probability exceeding the first threshold, compute a second probability as to whether the extracted N LSBs represents a hidden image that matches an image represented in the pixels of the image file for which the N LSBs have not been extracted.

In Example 11, the subject matter of Example 10 can optionally include that the one or more processors are configured to, responsive to a determination that the second probability is less than a second threshold, perform the non-image classifier on the extracted N LSBs In Example 12, the subject matter of any of Examples 9-11 can optionally include N is 1, 2, or 3.

In Example 13, the subject matter of any of Examples 9-12 can optionally include that the image file is selected from a group consisting of a portable network graphics (PNG) file and a bitmap file.

In Example 14, the subject matter of any of Examples 9-12 can optionally include the the non-image classifier includes a convolutional neural network.

In Example 15, the subject matter of any of Examples 9-14 can optionally include that the one or more processors are configured to apply a mask to each of the extracted N least significant bits.

Example 16 is a method including extracting, by a computing resource, N least significant bits from each of a first set of pixels of an image file, wherein N is an integer greater than or equal to 1, applying, by the computing resource, a mask to each of the extracted N least significant bits to form a second set of pixel values, and determining, by the computing resource, a first probability as to whether the second set of pixels encodes a hidden image. Responsive to the first probability exceeding a first threshold, the method includes determining, by the computing resource, a second probability as to whether the second set of pixels matches an image encoded in the first set of pixels. Responsive to a determination that the second probability is less than a second threshold, the method includes performing, by the computing resource, a non-image classifier on the second set of pixels.

In Example 17, the subject matter of Example 16 can optionally include, responsive to the first probability not exceeding the first threshold, causing the computing resource to perform the non-image classifier on the second set of pixels.

In Example 18, the subject matter of any of Examples 16-17 can optionally include, responsive to the second probability exceeding the second threshold, causing the computing resource to generate an output indicating that the image file includes a hidden image.

In Example 19, the subject matter of any of Examples 16-18 can optionally include, responsive to the second probability exceeding the second threshold, causing the computing resource to generate an output indicating that the image file includes a hidden image.

In Example 20, the subject matter of any of Examples 16-19 can optionally include performing the non-image classifier includes using a convolutional neural network.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory storage device storing machine instructions, wherein the machine instructions, when executed by a computing resource, cause the computing resource to at least:
   extract N least significant bits from each of a first set of pixels of an image file, wherein N is an integer greater than or equal to 1;
   apply a mask to each of the extracted N least significant bits to form a second set of pixel;
   determine a first probability as to whether the second set of pixels encodes a hidden image;
   responsive to the first probability exceeding a first threshold, determine a second probability as to whether the second set of pixels matches an image encoded in the first set of pixels; and
   responsive to a determination that the second probability is less than a second threshold, perform a non-image classifier on the second set of pixels.

2. The non-transitory storage device of claim 1, wherein responsive to the first probability not exceeding the first threshold, the machine instructions, when executed, cause the computing resource to perform the non-image classifier on the second set of pixels.

3. The non-transitory storage device of claim 2, wherein responsive to the second probability exceeding the second threshold, the machine instructions, when executed, cause the computing resource to generate an output indicating that the image file includes a hidden image.

4. The non-transitory storage device of claim 1, wherein responsive to the second probability exceeding the second threshold, the machine instructions, when executed, cause the computing resource to generate an output indicating that the image file includes a hidden image.

5. The non-transitory storage device of claim 1, wherein the machine instructions, when executed, cause the computing resource to perform the non-image classifier using a convolutional neural network.

6. The non-transitory storage device of claim 1, wherein the machine instructions, when executed, cause the computing resource to perform the non-image classifier using a convolutional neural network that determines whether information encoded in the extracted N least significant bits comprises at least one of American Standard Code for Information Interchange (ASCII) characters, binary data, and encrypted data.

7. The non-transitory storage device of claim 1, wherein the image file is uncompressed.

8. The non-transitory storage device of claim 1, wherein N is 1, 2, or 3.

9. A system to determine a type of concealed information steganographically encoded into an image file, the system comprising:
   a network interface to receive an image file; and
   one or more processors coupled to the network interface;
   wherein the one or more processors are configured to:
      extract N least significant bits (LSBs) from each of a first set of pixels of the image file, wherein N is an integer greater than or equal to 1;
      compute a first probability as to whether the extracted N LSBs encode a hidden image;
      responsive to the first probability not exceeding a first threshold wherein the first threshold is indicative of the extracted N LSBs encoding a hidden image, perform a non-image classifier on the extracted N LSBs; and
      responsive to the first probability exceeding the first threshold, compute a second probability as to whether the extracted N LSBs represents a hidden image that matches an image represented in the pixels of the image file for which the N LSBs have not been extracted.

10. The system of claim 9, wherein the one or more processors are configured to, responsive to a determination that the second probability is less than a second threshold, perform the non-image classifier on the extracted N LSBs.

11. The system of claim 9, wherein N is 1, 2, or 3.

12. The system of claim 9, wherein the image file is selected from a group consisting of a portable network graphics (PNG) file and a bitmap file.

13. The system of claim 9, wherein the non-image classifier includes a convolutional neural network.

14. The system of claim 9, wherein the one or more processors are configured to apply a mask to each of the extracted N least significant bits.

15. A method, comprising:
   extracting, by a computing resource, N least significant bits from each of a first set of pixels of an image file, wherein N is an integer greater than or equal to 1;
   applying, by the computing resource, a mask to each of the extracted N least significant bits to form a second set of pixel;
   determining, by the computing resource, a first probability as to whether the second set of pixels encodes a hidden image;
   responsive to the first probability exceeding a first threshold, determining, by the computing resource, a second probability as to whether the second set of pixels matches an image encoded in the first set of pixels; and
   responsive to a determination that the second probability is less than a second threshold, performing, by the computing resource, a non-image classifier on the second set of pixels.

16. The method of claim 15, wherein responsive to the first probability not exceeding the first threshold, causing the computing resource to perform the non-image classifier on the second set of pixels.

17. The method of claim 16, wherein responsive to the second probability exceeding the second threshold, causing the computing resource to generate an output indicating that the image file includes a hidden image.

18. The method of claim 15, wherein responsive to the second probability exceeding the second threshold, causing the computing resource to generate an output indicating that the image file includes a hidden image.

19. The method of claim 15, wherein performing the non-image classifier includes using a convolutional neural network.

* * * * *